April 12, 1932. A. B. BENOIT 1,854,015
STRAINER
Original Filed Dec. 16, 1926  2 Sheets-Sheet 1
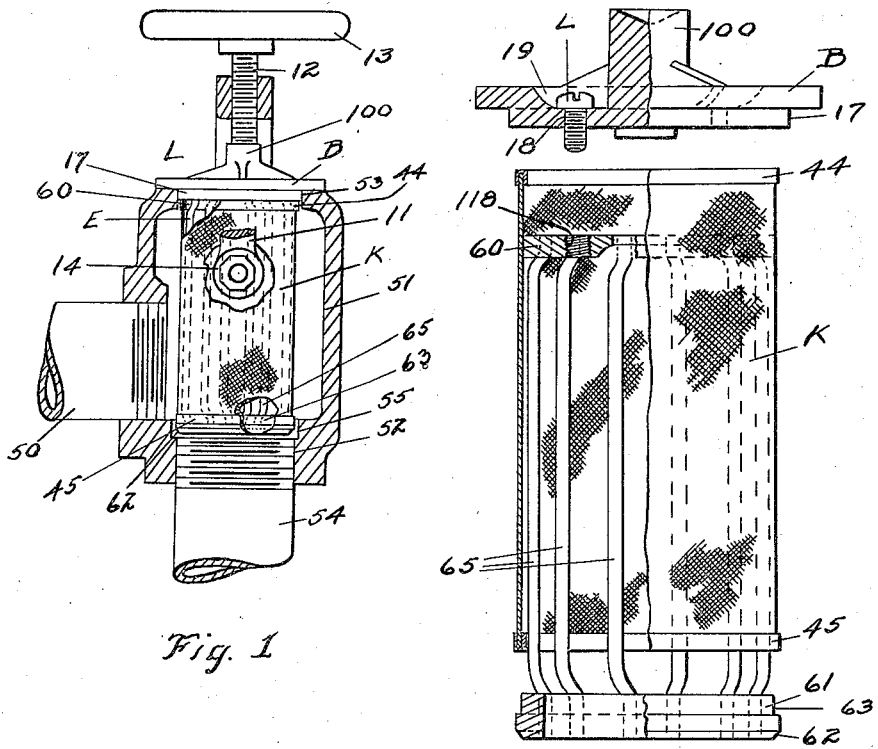
Fig. 1.
Fig. 2.
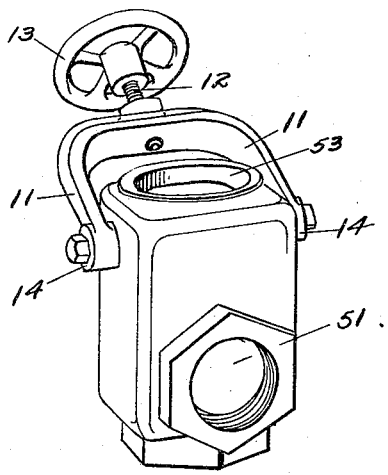
Fig. 3.
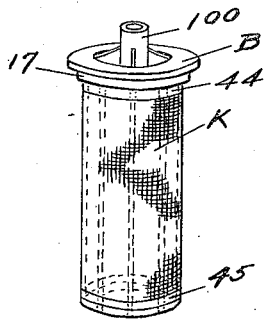
Fig. 4.
INVENTOR.
Arthur B. Benoit
BY
Gardner W. Pearson
ATTORNEY.

April 12, 1932.  A. B. BENOIT  1,854,015
STRAINER
Original Filed Dec. 16, 1926   2 Sheets-Sheet 2
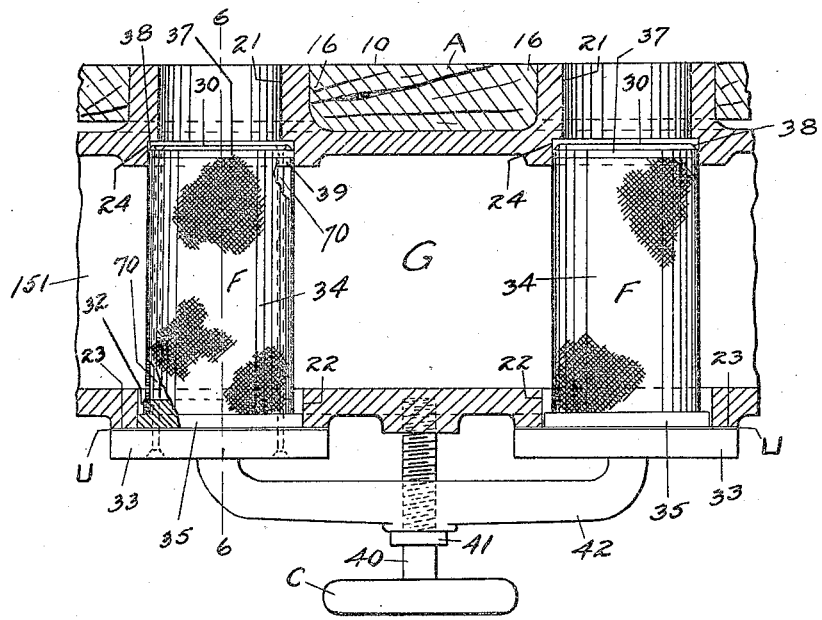
Fig. 5.
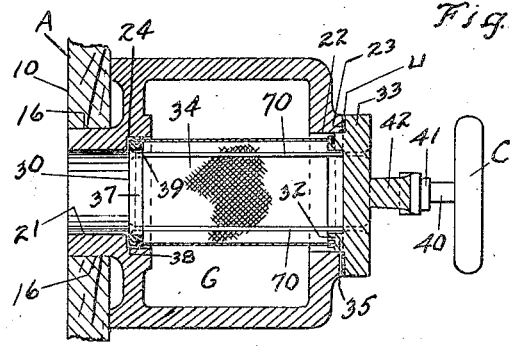
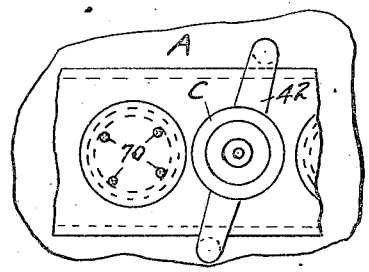
Fig. 7.
Fig. 6.
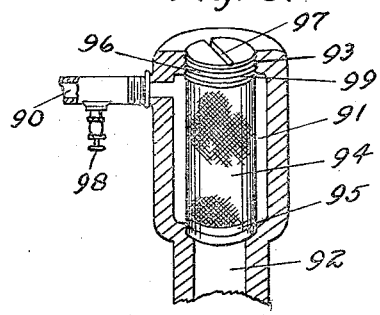
Fig. 8.
INVENTOR.
Arthur B. Benoit
BY
Gardner A. Pearson
ATTORNEY.

Patented Apr. 12, 1932

1,854,015

UNITED STATES PATENT OFFICE

ARTHUR B. BENOIT, OF LAWRENCE, MASSACHUSETTS

STRAINER

Original application filed December 16, 1926, Serial No. 155,298. Divided and this application filed April 7, 1928. Serial No. 268,107.

This invention relates to a certain type of cylindrical or cartridge shaped strainer such as described in my application for Letters Patent Serial Number 155,298 filed Dec. 16, 1926, and is a division of and shows an improvement on the type therein shown.

This type of strainer is used in a chamber having a water inlet, an outlet hole in one wall and a strainer hole in the opposite wall. The outlet hole is smaller than the strainer hole so that the whole strainer can be removed from the outside through the strainer hole. One end of the strainer is open and is larger than outlet hole which it engages and closes and the imperforate head of the strainer closes the strainer hole in the opposite wall but in such manner that the whole strainer can readily be removed therethrough.

This type of strainer is usually held in place by a clamp or yoke which engages the outside of its head, or the head may be screwed in place. In any event however it is arranged so that it can quickly be removed from the outside and then quickly cleaned by passing a disc of steam through it from the inside.

I find however that the screen wears out more rapidly than the other parts and this particular application also comprises a cylindrical or cartridge shaped strainer including an imperforate head, a cage and a meshed cylinder surrounding the cage and held in position thereby in such manner that it can quickly be removed and replaced by a new one.

In the drawings, Fig. 1 is a vertical section showing my preferred form of strainer device with my preferred form of strainer and attaching means.

Fig. 2 is an elevation showing the strainer alone with its head, cage and screen slightly separated.

Fig. 3 is a perspective showing my preferred form of strainer chamber disconnected from its inlet and outlet pipes and with the strainer removed, the attaching yoke being shown as swung out of the way.

Fig. 4 is a perspective view showing the same strainer illustrated in Figs. 1 and 2 as removed from the chamber shown in Fig. 3.

Fig. 5 is a horizontal sectional view through a manifold which comprises one or more strainer chambers with a somewhat different type of strainers and means to hold the strainers in position in the strainer chamber.

Fig. 6 is a sectional view looking toward the right on the line 6—6 of Fig. 5.

Fig. 7 is an elevation of the manifold shown in Fig. 5 with the clamping means turned to allow the strainers to be removed.

Fig. 8 is a sectional view in perspective showing a somewhat modified type of strainer chamber and strainer.

In the drawings, Fig. 1 shows one of my separable cartridge shaped strainers applied to a water supply pipe such as 50. This strainer is shown as comprising a head B, a cage E and cylindrical wire mesh screen K together with means represented by screws L for detachably attaching the cage and with it the screened cylinder to the head.

The strainer is shown as entering a cylindrical strainer chamber 51 which is substantially larger than the wire screen cylinder K.

Chamber 51 has an outlet 52 which connects with a pipe 54 and has a countersunk recess 55 to receive the open end of the strainer cylinder.

Opposite the outlet 52 is a strainer hole 53 in the opposite wall through which the cage E and screened cylinder K pass and against the outside of which rests the head B. This head is shown as closing the strainer hole and as being held in place by means of a yoke 11 through which passes a threaded clamping screw 12 operated by a wheel 13, the yoke 11, carrying screw 12 and wheel 13 being journaled at 14 so that the screw can be loosened and they can be swung down out of the way to permit the strainer cylinder to be removed from its head end.

For convenience in locating the strainer in hole 53 I prefer to form on the inside of head B an integral circular flange 17. I also preferably form a recess 19 from which through head B and flange 17 are the screw holes 18 for the attaching screws L, L. This recess 19 is preferably deep enough to bury the heads of screws L, L. Preferably also I extend upward from head B a boss 100 to engage the end of screw 12.

The cage E includes an attaching member 60 shown as of circular form and a holding ring 61 which may be chamfered at the end 62 to allow it readily to be inserted in outlet recess 55 and which fits snugly therein. It is preferably larger than attaching member 60 but has an annular recess 63 preferably the same size as attaching member 60 so that the cylindrical wire mesh screen K reinforced at each end by the rings 44 and 45 can slip over member 60 and fit snugly into annular groove 63 but cannot slip out over ring 61.

The attaching member 60 and ring 61 are held together by a plurality of rods 65 shown as headed over at each end, and of a size so that cylinder K will fit over them snugly and be supported thereby.

The screws L, L, are the means by which the cage E is detachably attached to head B through threaded holes 18 and 118.

When a screen cylinder K wears out and must be replaced, the screws L, L, are loosened and the cage E with the cylinder are separated from head B, when the old cylinder can be slipped off over attaching member 60 and a new cylinder slipped back in place. After this, the cage and cylinder can be re-attached to head B.

In Figs. 5, 6 and 7, A represents the wall of a tank having an outside casing represented by 10 through which are pierced the holes 16 which serve as inlet holes for the tank but outlet holes for the strainer chamber or chambers of the manifold G.

This manifold G is shown as of substantially square cross section and is fastened to tank A on the outside.

This manifold G which may be considered a strainer chamber has a water inlet as at 151 and has also in one wall an outlet hole such as 24 or a series of outlet holes 24 shown as annular grooves a little larger in size than the inside diameter of each discharge nozzle 21 of which they are a part.

In the opposite wall of chamber G is a strainer hole 22, and as shown, around this on the outside is an annular boss 23 against which preferably fits the elastic ring U carried inside the head 33 of each strainer F.

Each of these strainers includes the fine wire mesh screen cylinder 34 which may be called a foraminous cylinder and which is shown as fastened to an annular shoulder 32 of each head 33.

The diameter of this foraminous cylinder is such that it can pass in through a strainer hole 22 opposite an outlet hole 24, and each head 33 is larger than the strainer hole 22 whereby it, with the annular gasket U, makes a tight joint around the trued up edge 23 of each hole 22.

Each of these strainers is substantially in the form of a cartridge shell.

Between each two strainers F, F, is a clamp screw C which passes through a clamping bar 42, each end of which rests on a head 33. Hand screw C has a collar 41 on its shank 40 whereby, by tightening or loosening clamping screw C, the bar 42 will hold two strainers F in place, or it can be swung around so that any two of them may instantly be removed.

Each strainer head 33 is shown as having on its inside a circular or annular shoulder 35 which keeps gasket U in position and which preferably fits snugly into strainer hole 22. Inside shoulder 35 is another shoulder of circular or annular shape 32 of smaller diameter and around this fits the foraminous cylindrical screen 34.

At the open end 30 is a ring 37 preferably chamfered on one side at 38 to help direct the open end of the strainer into the outlet hole 24 and on its other side an annular shoulder 39 around which fits the other end of screen 34. Ring 37 preferably fits closely into or against outlet hole 24 and is attached to head 33 by rods 70, 70, thus forming a cage.

As shown in Fig. 8, I may use a cylindrical strainer chamber 91 with a water inlet 90 shown as capable of being controlled by valve 98 and having an outlet hole 92 shown as of smaller size than chamber 91, and in its opposite wall a threaded strainer hole 93.

The strainer is shown as including a head 96 threaded at 99 to engage the threads in hole 93 together with a holding ring 95 connected to the head 96 by the cylindrical screen 94. The ring 95, when the screen is in position, surrounds outlet hole 92 and, as the screen is smaller than the inside of strainer cylinder 91, the liquid entering inlet 90 can pass all around it on the outside thence to the inside, and through outlet 92.

By means of the slot 97, the strainer can be screwed into position or removed from position.

The threads 99 and those in hole 93 are the means to hold the strainer in position.

I claim:

1. The combination in a liquid straining device of a cylindrical strainer chamber having a water inlet, an outlet hole in one wall, and a strainer hole in the opposite wall; with an open ended strainer cylinder which extends through the strainer hole and engages the outlet hole, which cylinder includes a head which closes said strainer hole, a cage including an attaching member which is circular on the outside, a holding ring the end of which fits the outlet hole and which has an outside diameter greater than the outside diameter of the attaching member, rods which connect the attaching member and the holding ring, and a wire meshed cylinder reinforced at each end which surrounds the cage except the holding ring; together with means to attach the attaching member to the head.

2. An open ended strainer cylinder which cylinder includes a head imperforate except for cage attaching holes; a cage including an attaching member which is circular on the outside, a holding ring which has an outside diameter greater than the outside diameter of the attaching member and has an annular groove substantially the diameter of the holding ring and rods which connect the attaching member and the holding ring; and a wire meshed cylinder which encircles the rods, the attaching member and said groove in the holding ring; together with members to attach the attaching member to the head which members fill the cage attaching holes in the head when the cage is in place.

ARTHUR B. BENOIT.